(12) United States Patent
Alliss et al.

(10) Patent No.: US 10,359,784 B2
(45) Date of Patent: Jul. 23, 2019

(54) BALLOON MANEUVERING/POSITIONING SYSTEM

(71) Applicants: Randall J. Alliss, Leesburg, VA (US); Billy Daniel Felton, Gainesville, VA (US); Michael L. Mason, Ashburn, VA (US); Taylor Evan Matthews, San Diego, CA (US); Harvey Keith Smith, II, Solana Beach, CA (US); Rafy Uddin Athar, San Diego, CA (US)

(72) Inventors: Randall J. Alliss, Leesburg, VA (US); Billy Daniel Felton, Gainesville, VA (US); Michael L. Mason, Ashburn, VA (US); Taylor Evan Matthews, San Diego, CA (US); Harvey Keith Smith, II, Solana Beach, CA (US); Rafy Uddin Athar, San Diego, CA (US)

(73) Assignee: NORTHROP CRUMMAN SYSTEMS CORPORATION, Falls Church, VA (US)

(*) Notice: Subject to any disclaimer, the term of this patent is extended or adjusted under 35 U.S.C. 154(b) by 84 days.

(21) Appl. No.: 15/478,958

(22) Filed: Apr. 4, 2017

(65) Prior Publication Data
US 2018/0284811 A1    Oct. 4, 2018

(51) Int. Cl.
| | | |
|---|---|---|
| *G05D 1/04* | (2006.01) | |
| *G01W 1/08* | (2006.01) | |
| *G01W 1/10* | (2006.01) | |

(52) U.S. Cl.
CPC .............. *G05D 1/042* (2013.01); *G01W 1/08* (2013.01); *G01W 1/10* (2013.01); *B64C 2201/022* (2013.01); *B64C 2201/14* (2013.01)

(58) Field of Classification Search
CPC .......... G05D 1/042; G01W 1/08; G01W 1/10; B64C 2201/022; B64C 2201/14
See application file for complete search history.

(56) References Cited

U.S. PATENT DOCUMENTS

| | | | |
|---|---|---|---|
| 8,820,678 B2 | 9/2014 | DeVaul et al. | |
| 2014/0014770 A1* | 1/2014 | Teller ........................ | B64B 1/40 244/97 |
| 2014/0319270 A1* | 10/2014 | DeVaul .................. | G05D 1/104 244/96 |
| 2017/0113799 A1* | 4/2017 | Kovac ..................... | B64C 39/02 |

\* cited by examiner

*Primary Examiner* — Nadeem Odeh
*Assistant Examiner* — Michael V Kerrigan
(74) *Attorney, Agent, or Firm* — Tarolli, Sundheim, Covell & Tummino LLP

(57) ABSTRACT

An aviation system is disclosed that has the capabilities to position a high-altitude aviation vehicle within a designated geographic region for extended periods of time or maneuver the high-altitude aviation vehicle along predetermined designated paths.

13 Claims, 6 Drawing Sheets

US 10,359,784 B2

BALLOON MANEUVERING/POSITIONING SYSTEM

TECHNICAL FIELD

This disclosure relates generally to an aviation vehicle, and more specifically to a balloon maneuvering/positioning system.

BACKGROUND

Aviation has been used for a large variety of purposes over the course of modern history, including warfare, reconnaissance, weather, and communications. The earliest aviation vehicle was the balloon, which is still widely used today for a variety of purposes. Balloons are filled with a highly buoyant gas (e.g., helium) that allows the balloon to ascend to a maximum altitude before inevitably descending based on a variety of factors, including weight of the payload and temperature of the gas. As a result, a balloon may have a limited mission life that can depend on descent of the balloon from a respective mission altitude.

One example of modern balloon use is for weather prediction and communications. Weather balloons can be used to transport scientific payloads into the upper atmosphere (e.g., stratosphere) as high as 130,000 feet. Once the balloon has reached the desired altitude, it may be desirable to have the balloon remain in a designated geographic area for as long as possible. Cross winds, however, tend to cause the balloon to drift in directions substantially parallel to the Earth's surface.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure includes a method of maneuvering an aviation vehicle in a designated geographic region is disclosed that includes providing a high altitude balloon system that includes a payload having a control system, launching the balloon system to an initial mission optimum altitude, determining an optimum altitude of the balloon system based on environmental parameters where the optimum altitude is an altitude where a time that the balloon system remains within a perimeter of the geographic region is maximized, and adjusting the altitude of the balloon system to the optimum altitude if the optimum altitude differs from the initial mission optimum altitude.

Another example of the subject disclosure includes a balloon system is disclosed that includes a high altitude balloon, a payload attached to the weather balloon and including electronic equipment that records and transmits weather data, and a control system that processes the weather data to maneuver the balloon to an optimum altitude within an altitude range of a geographic region where the optimum altitude is an altitude where a time that the balloon system remains within a perimeter of the geographic region is maximized.

Still another example of the subject disclosure includes a method of positioning a high-altitude aviation vehicle at an optimum altitude within a designated geographic region is disclosed that includes providing a balloon system, determining an altitude range for the balloon system, determining an initial mission optimum altitude for the balloon system within the altitude range based on current and/or forecasted weather conditions, launching the balloon system to the initial mission optimum altitude, determining a post-launch optimum altitude at designated altitudes within the altitude range, and adjusting the altitude of the balloon system to the post-launch optimum altitude.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
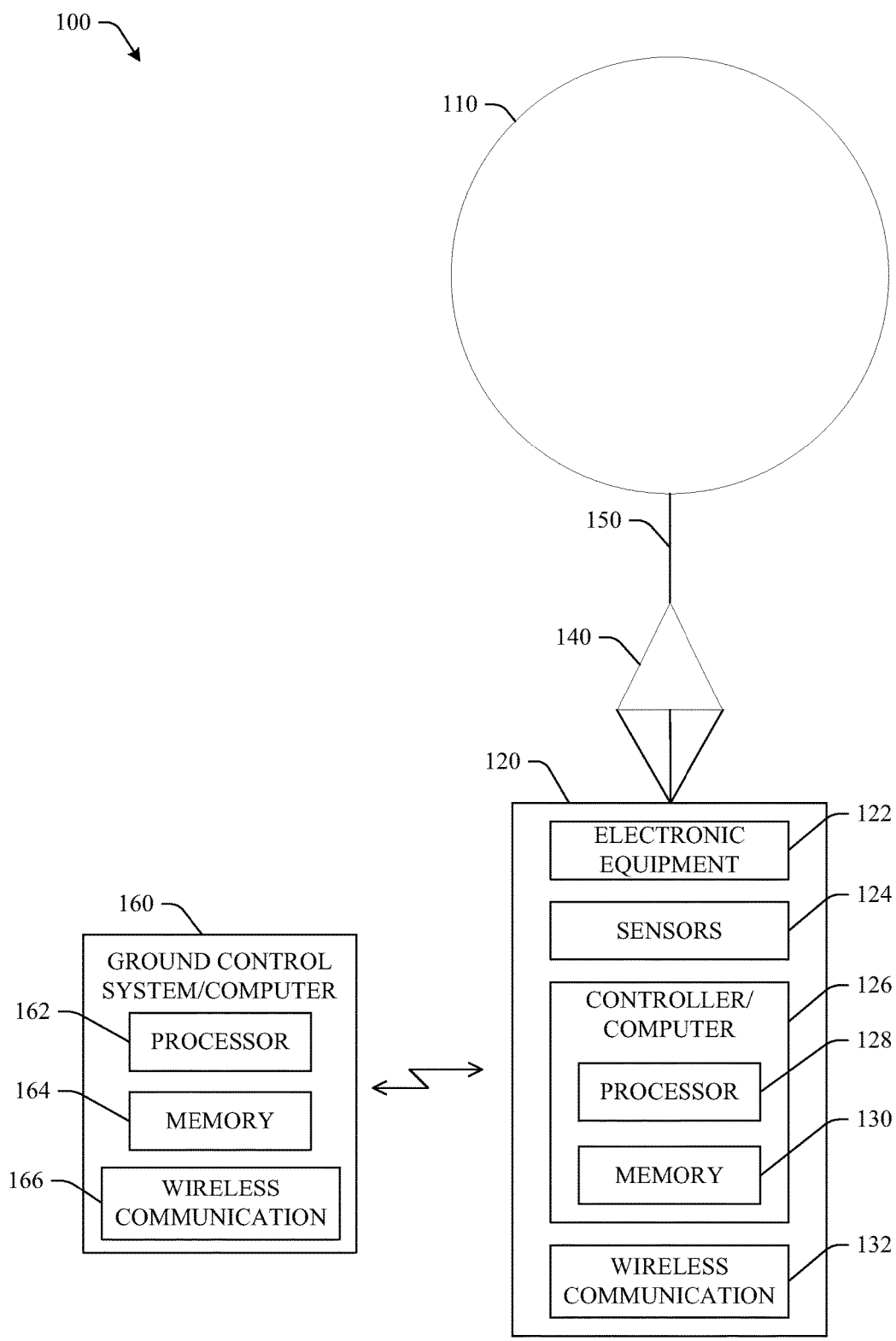
FIG. 1 illustrates an example of a balloon system.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

While specific characteristics are described herein (e.g., thickness, orientation, configuration, etc.), it is to be understood that the features, functions and benefits of the subject disclosure can employ characteristics that vary from those described herein. These alternatives are to be included within the scope of the disclosure and claims appended hereto.

Disclosed herein is an example system and method to achieve a mission objective regarding maneuvering an aviation vehicle in the Earth's upper atmosphere (e.g., stratosphere). More specifically, the subject disclosure includes maneuvering and/or positioning a balloon system (e.g., weather balloon, communications balloon, surveillance balloon, etc.) in the stratosphere. Balloons of this nature are high altitude (approximately 60,000-130,000 feet), high endurance balloons that are configured to carry electronic measuring and communication equipment into the stratosphere to record and/or send back information relating to environmental conditions (e.g., atmospheric pressure, temperature, humidity, wind speeds, etc.), communication applications, surveillance applications, near space experiments, etc.

The mission objective for the example disclosure includes positioning the balloon system in the stratosphere (approximately 60,000-130,000 feet) at an optimum altitude such that the balloon system remains in a designated geographic region for a maximum time period. It is to be understood and appreciated, however, that the mission objective is based on the application of the balloon system and can change from one balloon system to the next. For example, as described further below, the mission objective may be to determine a path for the balloon system to travel to remain in the geographic area or have the balloon system travel along a designated path form one geographic location to another or to maintain a back and forth travel path along a border, etc.

As mentioned above, the mission objective of the disclosed balloon system is to have the balloon system remain in a designated geographic region for a maximum amount of time. Horizontal winds have the tendency to cause the balloon to drift in a horizontal direction thereby causing the balloon to migrate toward a perimeter (boundary) of the designated geographic region. The example balloon positioning system and method is configured to maximize the time (migration time) that the balloon reaches the perimeter. More specifically, as will be described in greater detail below, the system and method continuously determines an optimum altitude for the balloon that maximizes the migration time to the perimeter or, in other words, maximizes the time that the balloon system remains within the perimeter. The system then changes the altitude thereby subjecting the balloon to cross winds at different altitudes that may have a different velocity and/or direction. The change in wind velocity and/or direction in turn affects a speed and/or direction of the balloon. This continuous process maneuvers the balloon to an optimum altitude such that the time that the balloon remains in the geographic region is maximized.

Referring now to the figures, FIG. 1 is an example of an aviation vehicle and more specifically, of an example balloon system (e.g., weather balloon, communications balloon, etc.) 100. The balloon system 100 includes a balloon 110, a payload 120, a parachute 140 connected to the payload 120, a rope or cord 150 that connects the parachute 140 to the balloon 110, and a control system/computer 160 having a memory and a processor. The control system/computer 160 is configured to perform control functions of the balloon system 100 including the method disclosed herein and may be located in the payload 120 of the balloon system 100 or, as illustrated in FIG. 1, may be stationed remotely on the ground. The control system/computer 160 can be implemented as an ASIC or a general purpose computer having a processor 162 that accesses a non-transitory machine readable memory 164, etc. and may include a wireless communications module 166. The balloon 110 can be formed of a thin, lightweight polymer material (e.g., neoprene, latex, polyethylene, etc.) and is configured to hold a gas that is more buoyant than air (e.g., hydrogen, helium, etc.). Thus, as mentioned above, the balloon 110 can achieve altitudes into the Earth's stratosphere.

The payload 120 is configured to contain electronic equipment 122 that records and/or transmits data to a receiver/controller on the ground. For example, the electronic equipment may include weather equipment, such as a radiosonde that measures atmospheric parameters (e.g., altitude, pressure, temperature, relative humidity, wind speed and direction, latitude, longitude, etc.). The electronic equipment may further include positioning detection equipment (e.g., GPS, radar equipment, etc.).

The payload 120 may also contain sensors 124 that record and transmit weather data in real-time collected during the flight of the balloon system 100. The real-time weather data can be used as feedback information for the method to make real-time adjustments during operation of the balloon system 100. Still further, the payload 120 may contain a controller (control system)/computer 126 having a processor 128 and a memory 130 configured to, among other things, control the electronic equipment 122, the sensors 124, an altitude system (not shown) configured to change the altitude of the balloon system 100, communicate, via a communications module 132, with the ground control system/computer 160, etc. The altitude system may be any type conventional altitude system known in the art and thus, will not be described in detail herein.

Communication between the ground control system/computer 160 and the balloon system 100 may utilize one or more wireless protocols, such as but not limited to optical, RF, cellular, infrared, etc. For example, the ground control system/computer 160 and the balloon system 100 may be configured to communicate with each other using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In view of the foregoing structural and functional features described above, a method shown herein, e.g., in the form of flow charts, in accordance with various aspects of the present disclosure will be better appreciated with reference to FIGS. 2-7. While, for purposes of simplicity of explanation, the method of FIGS. 2-7 are shown and described as executing serially, it is to be understood and appreciated that the present disclosure is not limited by the illustrated order, as some aspects could, in accordance with the present disclosure occur in different orders and/or concurrently with other aspects from that shown and described herein. Moreover, not all illustrated features may be required to implement a method in accordance with an aspect of the present disclosure.

Figure 2:
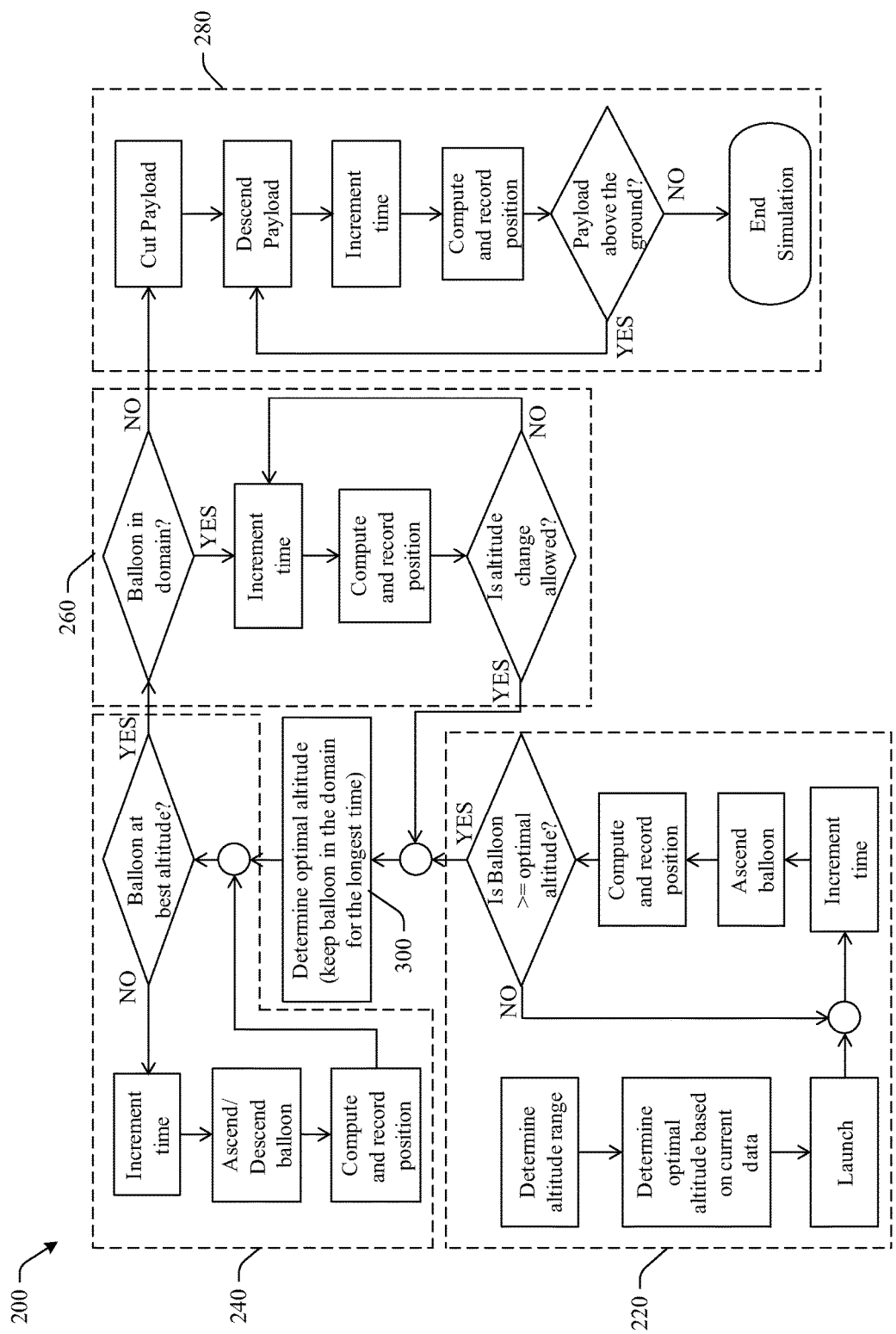
FIG. 2 illustrates an example of an overall view of a method of positioning and maintaining the position of the balloon system in a geographic region for a maximized time period.

FIG. 2 is an example method 200 of maneuvering and positioning the balloon system 100 in a designated geographic region R (see FIG. 8) to maximize a time that the balloon system 100 remains within the geographic region R. The method 200 includes multiple stages including a launch stage 220, an altitude adjustment stage 240, a horizontal position determination stage 260, a descent stage 280, and an optimum altitude determination stage 300. Each stage will be subsequently described with reference to FIGS. 2-7. It is to be understood that the subject disclosure is not dependent on the size and/or shape of the geographic region. The geographic region can be any regular (e.g., circular, square, rectangular, etc) or irregular shape and size.

Figure 3:
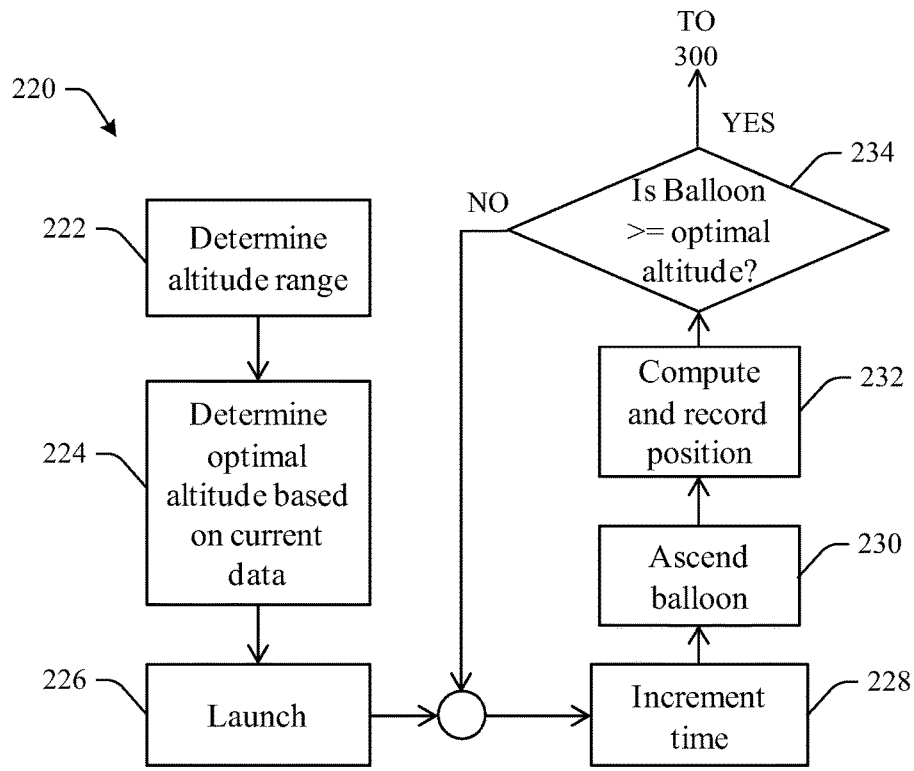
FIGS. 3-6 are example methods of various stages of the overall method of FIG. 2.

Referring to FIG. 3, the launch stage 220 launches the balloon system 100 to an initial mission optimum altitude by determining an altitude range for the balloon system 100. The initial mission optimum altitude is determined based on environmental parameters such as current and/or forecasted weather conditions, wind direction, size of the geographic region R, time to reach the initial mission optimum altitude, trajectory, geographical location, etc. The launch stage 220 then launches the balloon system 100 to the initial mission optimum altitude.

Specifically, at 222, an altitude range for the balloon system 100 is determined. The altitude range may vary based on the type and application (i.e., mission objective) of the balloon system. The altitude range includes a minimum (first) altitude, a maximum (last) altitude, and a number of intermediate continuous (second, third, etc.) altitudes up to the maximum altitude. A distance between adjacent altitudes may be equal or may be random, which may depend on the geographic region, weather conditions, etc. At 224, an initial mission optimum altitude is predicted or determined based on current and/or forecasted weather conditions and other parameters mentioned above. The current and forecasted weather conditions may include weather conditions within the altitude range or outside the altitude range (e.g., ground conditions, etc.). Similarly, the current and forecasted weather conditions may also include weather conditions within or outside the geographic region R. The forecasted weather conditions may include forecasted weather conditions of unlimited equal (e.g., every 15 minutes, 30 minutes, 60 minutes, etc.) or random time intervals for an unlimited time period.

226 through 234 is a sequence of launching the balloon system 100 to the predicted optimum altitude. Specifically, at 226, the balloon system is launched. At 228, an increment of time is measured and recorded. At 230, the balloon system 100 is ascended for the increment of time determined in 228. At 232, a position of the balloon system 100 is computed and recorded. At 234, a decision is made to determine if the altitude of the balloon system 100 is greater than or equal to the initial optimum altitude calculated in 224. If 234 is "NO," then the launch stage 220 loops back to 228 and 228 through 234 are repeated. Once the decision at 234 is "YES," the method 200 exits stage 220 and proceeds to stage 300.

In stage 300, which will be described in detail further below with reference to FIGS. 7 and 8, the method performs multiple iterations to determine an optimum altitude (post-launch optimum altitude) for the balloon system 100 in the geographic region R. As mentioned above, the optimum altitude is the altitude where the time that the balloon system 100 remains in the geographic region R is maximized. The determination is based on current and forecasted weather conditions described above. The iterations are performed for each altitude in the altitude range determined at 222 in stage 220. Once the iterations are complete, the method 200 exits stage 300 and proceeds to stage 240.

Figure 4:
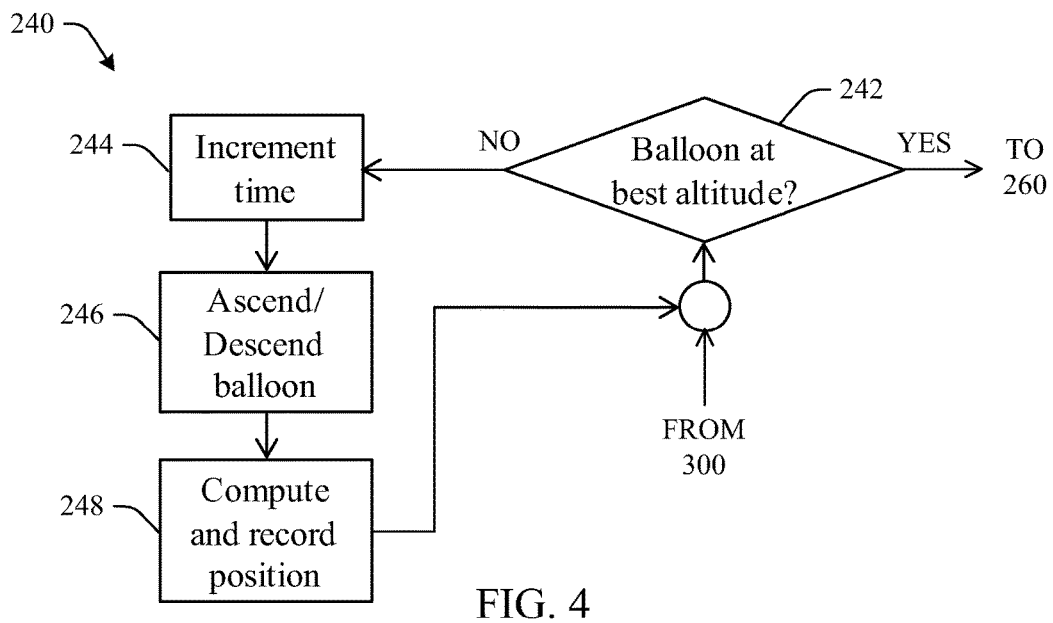

Referring to FIG. 4, once the iterations from stage 300 are complete, stage 240 determines if the current altitude of the balloon system 100 is at the optimum altitude. Stage 240 either increases or decreases the altitude of the balloon system 100 to the optimum altitude. Specifically, at 242, a decision is made to determine if the balloon system 100 is at the best altitude based on the iterations performed in stage 300. In other words, the current altitude of the balloon system 100 is compared to the optimum altitude determined in stage 300. If the altitudes are different, the decision is "NO." Stage 240 then proceeds to 244 where an increment of time is measured and recorded. At 246, the balloon system 100 ascends or descends to the best altitude determined in stage 300. At 248, the position of the balloon system 100 is computed and recorded. The stage loops back to 242 and repeats as long as the decision at 242 is "NO." If the two altitudes are the same, then the decision at 242 is "YES" and the method exits stage 240 and proceeds to stage 260.

Figure 5:
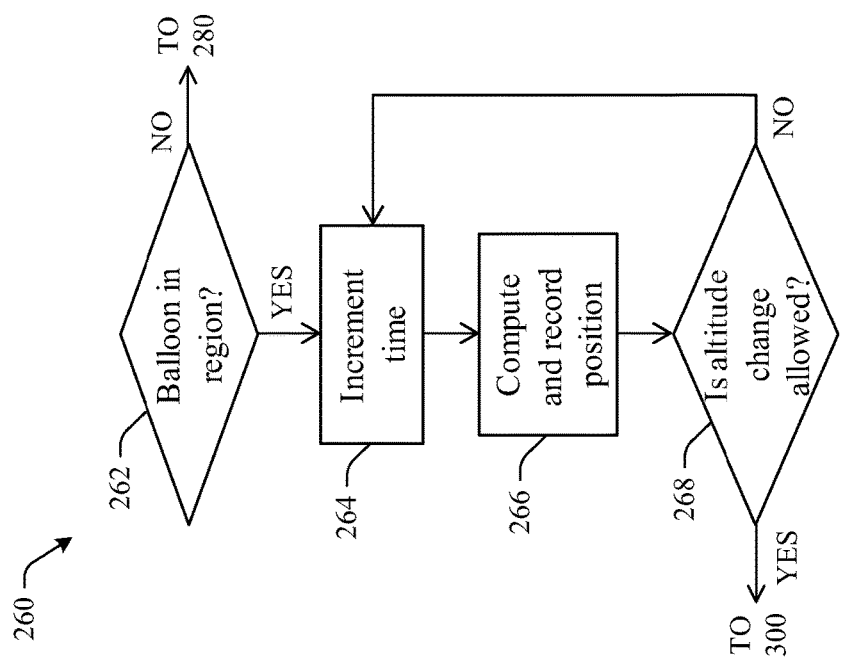

Referring to FIG. 5, stage 260 determines if the balloon system 100 is still within the geographic region R and if it is, it then determines if a change in altitude of the balloon system 100 is permitted. Specifically, at 262 a decision is made to determine if the balloon system 100 is in the geographic region R using positioning detection equipment (e.g., GPS, radar, etc.). If the decision is "NO", the method 200 proceeds to stage 280. If the decision is "YES," then at 264, an increment of time is measured and recorded. At 266, after the increment of time the position of the balloon system is computed and recorded. At 268, a decision is made to determine if the balloon system 100 is in a state that would allow a change in altitude (altitude change state). To determine a status of the altitude change state, the control system 126 determines if control system parameters are such that a state of the parameters either allows the balloon system 100 to change altitude (i.e., the altitude change state is "ON") or prevents the balloon system 100 from changing altitude (i.e., the altitude change state is "OFF").

One control system constraint may include a status of a power system for the altitude system. For example, the power system may be comprised of re-chargeable batteries that may be re-charged via an external power source (e.g., solar power). If the re-chargeable batteries are not sufficiently charged to change the altitude of the balloon system 100, the control system 126 will determine that the state of the balloon system 100 is not in a state to change the altitude (i.e., the altitude change state is "OFF"). Thus, the decision at 268 will be "NO" and stage 260 will repeat 264-268 until the balloon system 100 is allowed to change altitude (i.e., the altitude change state is "ON"). Other control system parameters may include the time it takes for the balloon system 100 to ascend or descend to the next altitude, current and/or forecasted weather conditions, time to allow the collection of weather/environmental data, transmission of communications, predetermined time periods to allow a change in altitude, cost, time of day (e.g., day or night), etc. If the decision at 268 is "YES," then the method 200 proceeds back to stage 300 where a subsequent optimum altitude is determined based on a new latitudinal and longitudinal position of the balloon system 100.

Figure 6:
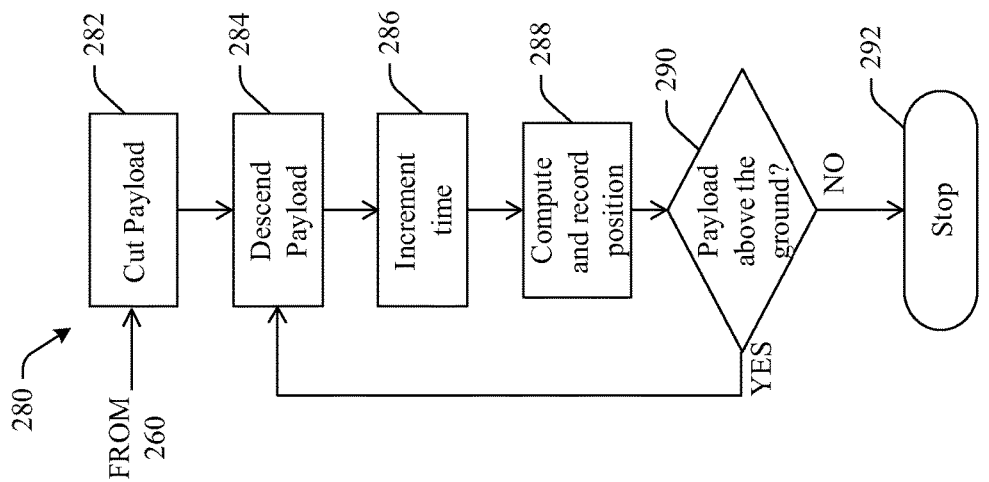

Referring to FIG. 6, when the method proceeds from stage 260 to stage 280 is an indication that the balloon system 100 is no longer in the geographic region R. Stage 280 releases the payload 120 from the balloon 110 thus, allowing the payload 120 to descend to the ground via the parachute 130. Specifically, at 282, the payload is released from the balloon 110 (i.e., the rope 150 is cut thereby releasing the payload 120 from the balloon 110). At 284, the payload 120 descends toward the earth. At 286, an increment of time is measured and recorded and at which time, at 288, a position of the payload 120 is computed and recorded. At 290, a decision is made to determine if the payload 120 is still above the ground (i.e., still descending). If the decision at 290 "YES," then stage 280 loops back to 284 and 284-290 are repeated. If the decision at 290 is "NO," then the mission comes to an end and the method 200 ends.

Figure 7:
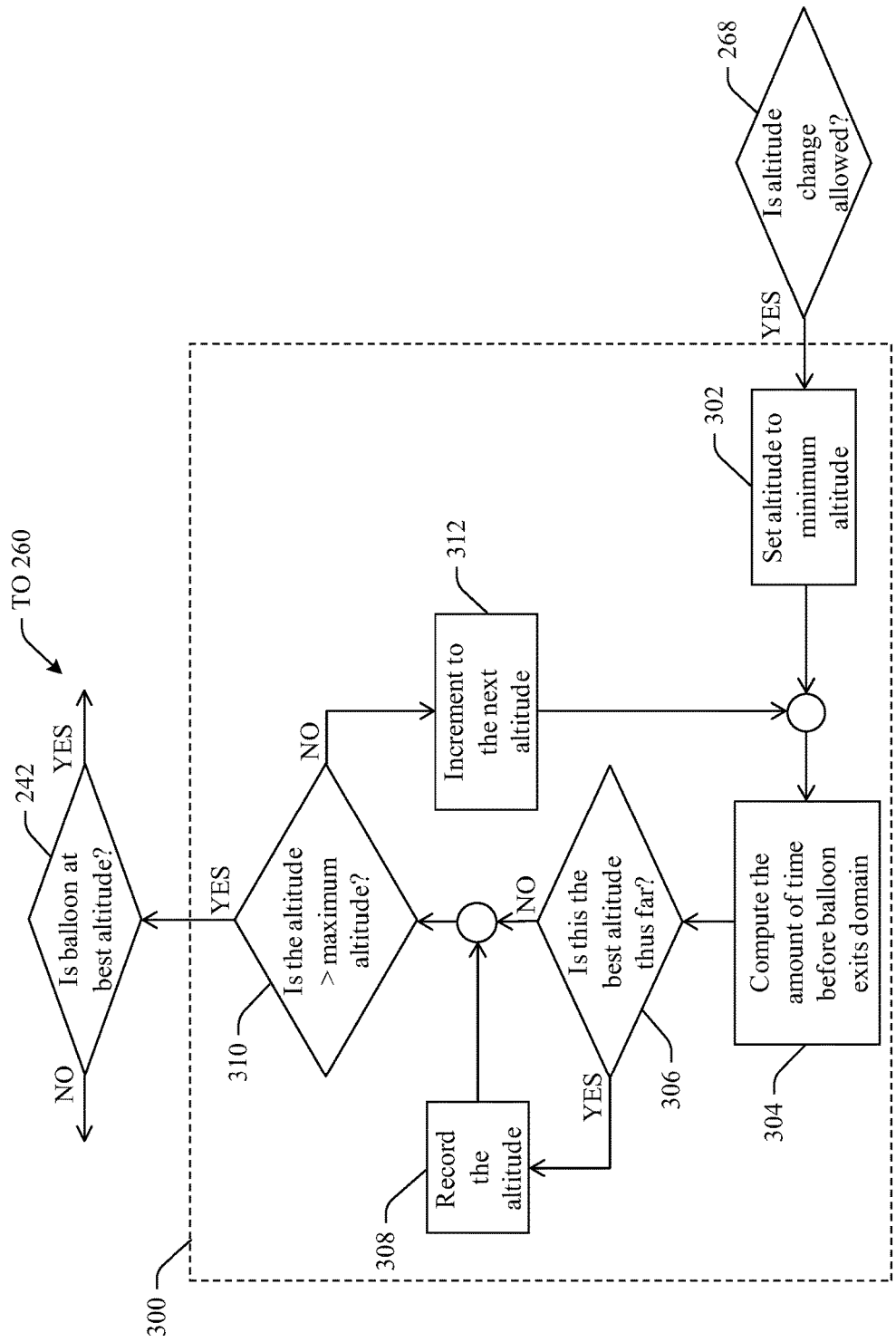
FIG. 7 is an example method of determining an optimum altitude of the balloon system within the geographical region.
Figure 8:
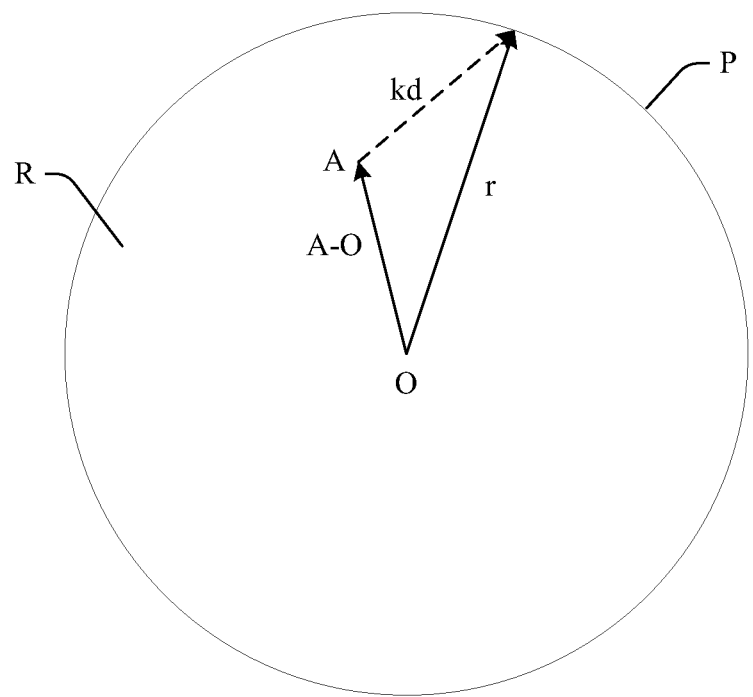
FIG. 8 is an example diagram schematically illustrating the method of determining an optimum altitude of the balloon.

Referring to FIGS. 7 and 8, stage 300 determines an optimum altitude of the balloon system 100 within the geographical region R based on parameters such as current location (latitude, longitude, and altitude) of the balloon system 100, current and/or forecasted weather conditions using a three-dimensional wind field, a size of the geographic region R, time of year, time of day, etc. Stage 300 performs multiple iterations to determine an altitude (optimum altitude) for the balloon system 100 in the geographic region R where the time that the balloon system 100 remains in the geographic region R is maximized. In other words, stage 300 determines the time (migration time) that the balloon system 100 takes to reach the perimeter P of the geographic region R in a direction of the wind at each designated altitude (i.e., how long it takes the wind at a given altitude to push the balloon system 100 out of the geographic region R). The altitude having the longest migration time is the optimum altitude. Stage 300 continuously performs iterations at each altitude in the altitude range based on the parameters mentioned above, and real-time data from sensors 124 to continuously search for the optimum altitude.

Specifically, at 302, stage 300 sets the altitude for calculation to the minimum (first) altitude. At 304, the migration time (an amount of time that the balloon system 100 takes to reaches a perimeter P of the geographic region R) is determined. Referring to FIG. 8, the migration time mt is determined by using equations 1-5 below. In equations 1-5 O is a center of the geographic region R, A is a current location of the balloon system 100, (A–O) is a vector between the center O and the current latitudinal and longitudinal position A of the balloon system 100, r is a radius of the geographic region, k is the wind direction at the current position A of the balloon system 100, d is the distance from the current position A of the balloon system 100 to the perimeter P of the geographic region R in a direction of the wind at the given altitude, and kd is a vector between the current position A and the perimeter in the direction of the wind where the scalar variable d is a magnitude of the vector. The magnitude d of the vector kd is unknown and can be computed using the following set of equations:

The sum of the vectors (A–O) and kd can be written as:

$$(A-O)+kd=r \quad \text{Eq. (1)}$$

Rearranging and squaring both sides of Eq. (1) yields:

$$(A+kd-O)^2=r^2 \quad \text{Eq. (2)}$$

where A+kd extends to a point of intersection with the perimeter P of the geographic region R in the direction of the wind. Expanding the left side of Eq. (2), rearranging terms, and subtracting $r^2$ from both sides, produces a quadratic equation shown in Eq. (3).

$$k^2d^2+2(k \cdot (A-O))d+(A-O)^2-r^2=0 \quad \text{Eq. (3)}$$

Solving for d yields the quadratic formula $$d = \frac{-b +/- \sqrt{b^2 - 4ac}}{2a} \quad \text{Eq. (4)}$$

where $a=k^2$, $b=2(k \cdot (A-O))$, and $c=(A-O)^2-r^2$

The discriminant (the portion of the quadratic formula under the square root) is calculated in order to determine if there are any real solutions. If the value of d is positive, the balloon system 100 is inside the geographic region R. If the discriminant is negative, d is undefined indicating that the balloon system 100 is outside of the geographic region R.

As shown in Eq. (5), the migration time mt (the time required for the balloon system 100 to intersect the perimeter P in the direction of the wind at the current altitude) is a distance from the balloon system 100 to the perimeter P in the direction of the wind d divided by the wind speed V at the current altitude.

$$mt = \frac{d}{V} \quad \text{Eq. (5)}$$

The altitude with the longest migration time mt is the optimum altitude to which the balloon system 100 should thus move.

Once a migration time is calculated, at 306 a decision is made to determine if the altitude that corresponds with the calculated migration time is the best altitude (i.e., is the mitigation time for the given altitude the longer than any previous determined mitigation time?). If the decision is "YES," the altitude is recorded at 308 and the method proceeds to 310. If the decision is "NO," the method bypasses 308 and jumps to 310. At 310, a decision is made to determine if the altitude exceeds the maximum altitude in the altitude range determined at 222 in stage 220. If the decision is "NO," then at 312, the altitude is incremented to the next altitude (e.g., second, third, etc.) in the altitude range and 304 through 310 are repeated. If the decision at 310 is "YES," the method exits stage 300 and proceeds to stage 240.

The method 200 repeats stages 240, 260, and 300 until the balloon system 100 is no longer in the geographic region R, at which time the method proceeds to stage 280. As mentioned above, stage 280 releases the payload 120 from the balloon system 100 and the method ends once the payload 120 reaches the ground.

In an alternative example, a path can be determined that would lay out a trajectory/altitude path for the balloon system to follow based on parameters disclosed herein for a period of time in the future. For example, the method could determine optimum altitudes at future times and automatically adjust the altitude at the specified time taking into account the trajectory of the balloon system between altitudes. In addition, real-time data from the sensors can be used to make adjustments to the trajectory/altitude path.

In another example, the balloon system can be configured to remain in a geographical region until the mission objective is complete. Once the mission objective is accomplished, the payload is released as described herein and the method ends once the payload reaches the ground.

In yet another example, the balloon system can be configured to travel along a designated geographical course or from one geographic location to a second geographic location and, if desired, to additional geographic locations. Still further, the balloon system can be configured maintain a travel path back and forth along a designated path (e.g., monitor conditions along a border of neighboring geographic regions).

As can be understood by one skilled in the art, there are many possible mission objectives that can be achieved with the example system and method disclosed herein. Specifically, the method described with reference to FIGS. 2-7 can include numerous variations that would facilitate maneuvering the balloon system in a variety of ways.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A method of maneuvering an aviation vehicle in a designated geographic region, the method comprising: providing a high altitude balloon system that includes a payload having a control system; launching the balloon system to an initial mission altitude; repeatedly calculating a migration time of the balloon system at a plurality of altitudes within an altitude range to determine an optimum altitude of the balloon system based on environmental parameters, where the migration time is a distance from the current position of the balloon system to a perimeter around the designated geographical region in a direction of wind divided by a velocity of the wind at each of the plurality of altitudes and where the optimum altitude is an altitude where the migration time is maximized; and adjusting the altitude of the balloon system to the optimum altitude if the optimum altitude differs from the initial mission altitude.

2. The method of claim 1, wherein launching the balloon system to the initial mission altitude includes:
determining an altitude range for the balloon system;
predicting an initial mission optimum altitude for the balloon system within the altitude range based on current and/or forecasted weather conditions;
launching the balloon system; and
determining if the balloon system is at an altitude at least equal to or greater than the initial mission optimum altitude.

3. The method of claim 1 further comprising determining if the balloon system is within the perimeter of the geographic region and determining a status of an altitude change state of the balloon system if the balloon system is within the perimeter of the geographic region, wherein the altitude change state is based on control system parameters.

4. The method of claim 3, wherein at least one control system parameter is a status of a power supply for an altitude system, wherein if the status of the power supply is re-charging, the altitude change state will be in an "OFF" state thereby disallowing the balloon system to change altitude and if the status of the power supply is not re-charging, the altitude change state is in an "ON" state thereby allowing the balloon system to change altitude.

5. The method of claim 4, wherein if the altitude change state is in an "ON" state, the method determining a subsequent optimum altitude of the balloon system based on environmental parameters relating to a new latitudinal and longitudinal position of the balloon system.

6. A balloon system comprising: a high altitude balloon; a payload attached to the balloon and including electronic equipment that records and transmits environmental data; and a control system that processes the environmental data to maneuver the balloon to an optimum altitude within an altitude range over a geographic region and that repeatedly calculates a migration time of the balloon system at designated altitudes within the altitude range, wherein the migration time is a distance from a current latitudinal and longitudinal position of the balloon in the geographic region to a perimeter around the geographic region in a direction of wind at each designated altitude divided by a velocity of the wind at each designated altitude, and wherein the optimum altitude is an altitude where the migration time is maximized.

7. The balloon system of claim 6, wherein the control system determines if the balloon is within the perimeter of the geographic region and if the balloon system is within the perimeter determines a status of an altitude change state, wherein the altitude change state is based on control system parameters.

8. The balloon system of claim 7, wherein at least one control system parameter is a status of a power supply for an altitude system, wherein if the status of the power supply is re-charging, the altitude change state is in an "OFF" state thereby disallowing the balloon system to change altitude and if the status of the power supply is not re-charging, the altitude change state is in an "ON" state thereby allowing the balloon system to change altitude.

9. The balloon system of claim 8, wherein if the altitude change state is in an "ON" state, the balloon system determines a subsequent optimum altitude of the balloon system based on environmental parameters relating to a new latitudinal and longitudinal position of the balloon system.

10. A method of positioning a high-altitude aviation vehicle at an optimum altitude within a designated geographic region, the method comprising: providing a balloon system; determining an altitude range for the balloon system; determining an initial mission optimum altitude for the balloon system within the altitude range based on current and/or forecasted weather conditions; launching the balloon system to the initial mission optimum altitude; repeatedly calculating a migration time of the balloon system at designated altitudes within an altitude range to determine a post-launch optimum altitude from among the designated altitudes within the altitude range; and adjusting the altitude of the balloon system to the post-launch optimum altitude, wherein the migration time is a distance from the current latitudinal and longitudinal position of the balloon system to a perimeter over the designated geographic region in a direction of wind divided by a velocity of the wind at each of the designated altitudes, and wherein the post-launch optimum altitude is an altitude where the migration time is maximized.

11. The method of claim 10 further comprising determining if the balloon system is within the perimeter of the geographic region and determining a status of an altitude change state of the balloon system if the balloon system is within the perimeter of the geographic region, wherein the altitude change state is based on control system parameters.

12. The method of claim 11, wherein at least one control system parameter is a status of a power supply for an altitude system, wherein if the status of the power supply is re-charging, the altitude change state will be in an "OFF" state thereby disallowing the balloon system to change altitude and if the status of the power supply is not re-charging, the altitude change state is in an "ON" state thereby allowing the balloon system to change altitude.

13. The method of claim 12, wherein if the balloon system is not within the perimeter of the geographic region the payload of the balloon system is released and descends to a ground surface.

* * * * *